(12) United States Patent
Oike et al.

(10) Patent No.: US 12,139,231 B2
(45) Date of Patent: Nov. 12, 2024

(54) HYDRAULIC SHOCK ABSORBER

(71) Applicant: Hitachi Astemo, Ltd., Hitachinaka (JP)

(72) Inventors: Ryo Oike, Hitachinaka (JP); Hiroyuki Miyata, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 645 days.

(21) Appl. No.: 17/388,814

(22) Filed: Jul. 29, 2021

(65) Prior Publication Data

US 2021/0354778 A1 Nov. 18, 2021

Related U.S. Application Data

(63) Continuation of application No. PCT/JP2019/026141, filed on Jul. 1, 2019.

(30) Foreign Application Priority Data

Mar. 4, 2019 (JP) ................. 2019-038817

(51) Int. Cl.
*B62K 25/08* (2006.01)
*F16F 9/06* (2006.01)
(Continued)

(52) U.S. Cl.
CPC .............. *B62K 25/08* (2013.01); *F16F 9/185* (2013.01); *F16F 9/34* (2013.01); *F16F 13/007* (2013.01);
(Continued)

(58) Field of Classification Search
CPC .. F16F 9/185; F16F 9/34; F16F 13/007; F16F 6/062; F16F 9/064; F16F 9/182;
(Continued)

(56) References Cited

U.S. PATENT DOCUMENTS 5,503,258 A * 4/1996 Clarke ............... F16F 9/48
 188/266.5
7,055,661 B2 * 6/2006 Bertrand ............ F16F 9/44
 188/315
(Continued)

FOREIGN PATENT DOCUMENTS

DE 602004008149 T2 4/2008
DE 602005005947 T2 5/2009
(Continued)

OTHER PUBLICATIONS

German Office Action mailed Oct. 5, 2023 for the corresponding German Patent Application No. 112019006550.5 (9 pages including English translation).

(Continued)

*Primary Examiner* — Bradley T King
*Assistant Examiner* — James K Hsiao
(74) *Attorney, Agent, or Firm* — Leason Ellis LLP; Edward J. Ellis; Melvin C. Garner

(57) ABSTRACT

A hydraulic shock absorber includes: a cylinder that has an opening portion in a side wall surface on an axle side thereof; a reservoir that stores oil; a control unit that generates a damping force; and a movement prevention member at least a part of which is disposed outside the cylinder and on a vehicle body side of the opening portion, and that obstructs the oil from moving from the axle side to the vehicle body side.

9 Claims, 4 Drawing Sheets

(51) Int. Cl.
  *F16F 9/18* (2006.01)
  *F16F 9/34* (2006.01)
  *F16F 13/00* (2006.01)
(52) U.S. Cl.
  CPC ............... *F16F 9/062* (2013.01); *F16F 9/064* (2013.01); *F16F 9/182* (2013.01); *F16F 2222/12* (2013.01); *F16F 2232/08* (2013.01); *F16F 2234/02* (2013.01)
(58) Field of Classification Search
  CPC ............... F16F 2222/12; F16F 2232/08; F16F 2234/02; B25K 25/08
  USPC ........................................................ 267/195
  See application file for complete search history.

(56) References Cited

U.S. PATENT DOCUMENTS

| | | | | |
|---|---|---|---|---|
| 9,604,694 | B2* | 3/2017 | Tomiuga | B62K 25/08 |
| 9,868,489 | B2* | 1/2018 | Murakami | B60G 17/048 |
| 10,286,975 | B2* | 5/2019 | Miyata | B62K 25/08 |
| 10,315,722 | B2* | 6/2019 | Murakami | B60G 17/048 |
| 10,370,057 | B2* | 8/2019 | Murakami | B62K 25/283 |
| 10,919,595 | B2* | 2/2021 | Murakami | F16F 9/466 |
| 11,760,147 | B2* | 9/2023 | Aoki | F16F 9/0227 188/297 |
| 2005/0073128 | A1 | 4/2005 | Wada et al. | |
| 2005/0074189 | A1 | 4/2005 | Wada et al. | |
| 2005/0133320 | A1* | 6/2005 | Fujita | F16F 9/3485 188/297 |
| 2005/0173214 | A1* | 8/2005 | Lemmens | B60G 17/08 188/322.13 |
| 2008/0230335 | A1* | 9/2008 | Furuya | F16F 9/067 188/315 |
| 2010/0207350 | A1* | 8/2010 | Uchiyama | F16F 9/06 280/276 |
| 2016/0272274 | A1 | 9/2016 | Murakami | |
| 2017/0036503 | A1* | 2/2017 | Murakami | B60G 17/027 |
| 2017/0282993 | A1* | 10/2017 | Miyata | B60G 11/56 |
| 2017/0282995 | A1* | 10/2017 | Murakami | B60G 17/048 |
| 2019/0127016 | A1 | 5/2019 | Murakami et al. | |

FOREIGN PATENT DOCUMENTS

| | | |
|---|---|---|
| DE | 102011000281 A1 | 7/2012 |
| EP | 1705396 A1 | 9/2006 |
| JP | 55-109147 U | 7/1980 |
| JP | 63-152739 A | 6/1988 |
| JP | 09-042347 A | 2/1997 |
| JP | 2002-243004 A | 8/2002 |
| JP | 2016-175556 A | 10/2016 |
| JP | 2017-180689 A | 10/2017 |

OTHER PUBLICATIONS

International Search Report mailed Aug. 27, 2019 for the corresponding International Patent Application No. PCT/JP2019/026141.
Written Opinion mailed Aug. 27, 2019 for the corresponding International Patent Application No. PCT/JP2019/026141.

* cited by examiner

HYDRAULIC SHOCK ABSORBER

CROSS-REFERENCE TO RELATED APPLICATION

This application is a continuation of PCT Application No. PCT/JP2019/026141, which was filed on Jul. 1, 2019, which claims the benefit of priority to Japanese Application No. 2019-038817 filed on Mar. 4, 2019, both of the contents of which are incorporated herein by reference in their entireties.

FIELD OF THE INVENTION

The present invention relates to a hydraulic shock absorber that buffers an impact from a road surface.

BACKGROUND OF THE INVENTION

As a suspension device for suspending a wheel in a straddle-type vehicle such as a two-wheeled vehicle and a three-wheeled vehicle, for example, there is known a hydraulic shock absorber described in Patent Literature 1 in which a vehicle body-side tube and a wheel-side tube are formed telescopically. In the hydraulic shock absorber of Patent Literature 1, when an impact due to unevenness of the road surface is received by the wheel, the wheel-side tube telescopically moves in and out of the vehicle body-side tube.

Patent Literature 1: JP-A-2017-180689 (published on Oct. 5, 2017)

However, in the hydraulic shock absorber of Patent Literature 1, when a straddle-type vehicle in which the hydraulic shock absorber is mounted vibrates in an upper-lower direction, oil inside a reservoir may move upward and may not stay in a vicinity of an opening portion leading from the reservoir to an interior of a cylinder. When the hydraulic shock absorber is rapidly extended in this situation, an amount of oil supplied to the interior of the cylinder may be insufficient, and air may be mixed with the oil flowing into a damping force generator to cause air biting. When air biting occurs, a desired damping force cannot be generated.

SUMMARY OF THE INVENTION

An object of an aspect of the present invention is to provide a hydraulic shock absorber which can stably generate a damping force.

In order to solve the above problems, a hydraulic shock absorber of an aspect of the present invention includes: a vehicle body-side tube that is disposed on a vehicle body side; an axle-side tube that is disposed on an axle side; a cylinder that is provided in the axle-side tube and has at least one opening portion in an axle-side side wall surface; a reservoir that is defined at an outer side of the cylinder and stores oil; a rod that is provided in the vehicle body-side tube; a piston that is provided on an axle side of the rod, and slides relative to an inner peripheral surface of the cylinder; a damping force generating unit that generates a damping force by oil flow due to a movement of the piston; and a movement prevention member at least a part of which is disposed outside the cylinder and on a vehicle body side of the opening portion, and that obstructs oil from moving from the axle side to the vehicle body side.

According to the aspect of the present invention, a damping force can be stably generated.

DETAILED DESCRIPTION OF THE INVENTION

Embodiment 1

An example of a front fork as an embodiment of a hydraulic shock absorber of the present invention will be described below.

Figure 1:
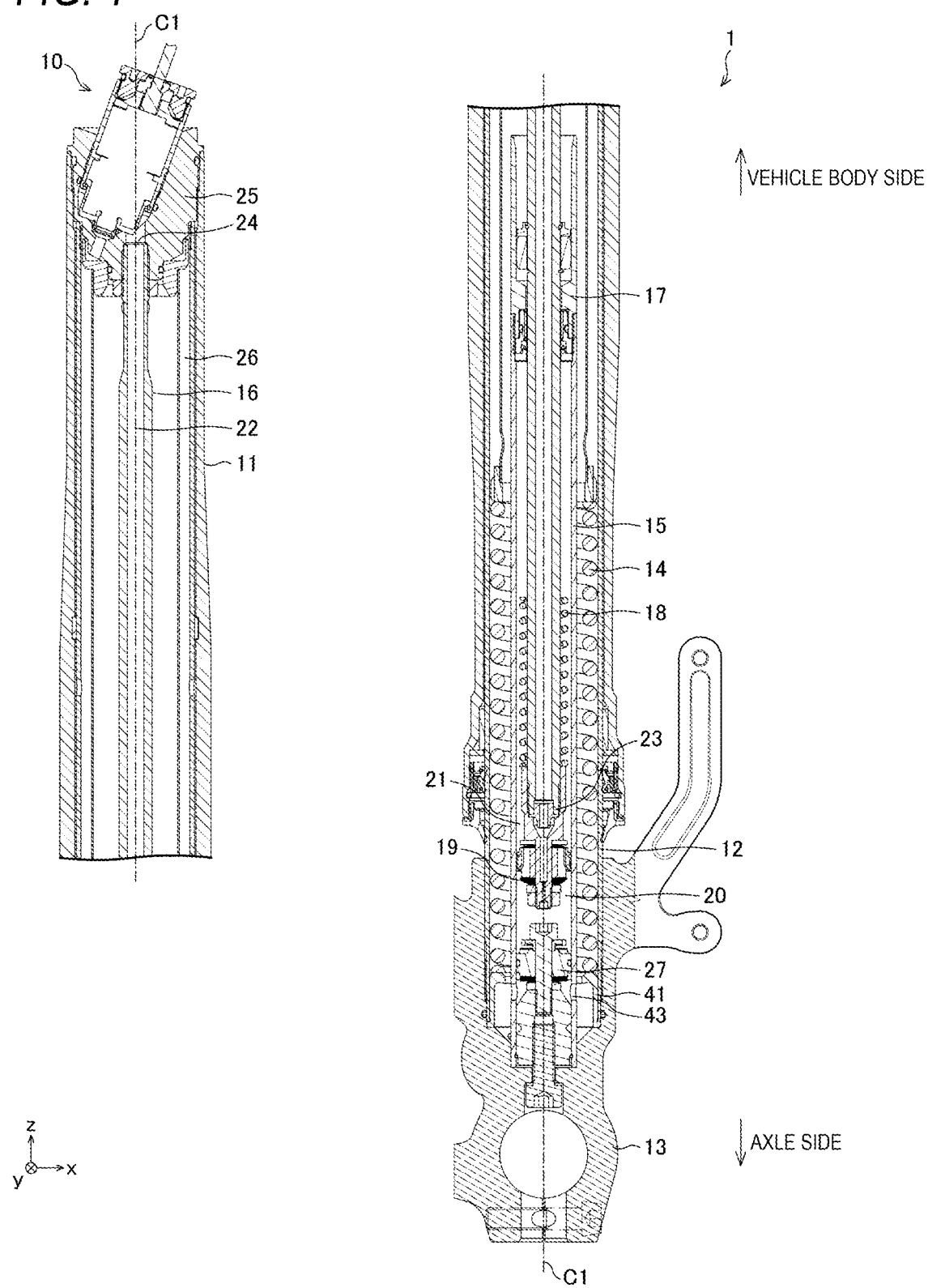
FIG. 1 is a cross-sectional view showing a configuration of a hydraulic shock absorber according to an embodiment of the present invention.

FIG. 1 is a cross-sectional view showing a configuration of a hydraulic shock absorber according to an embodiment of the present invention. A hydraulic shock absorber 1 is a device that is attached in pair to both left and right sides of a wheel (not shown) in a saddle-type vehicle such as a two-wheeled vehicle or a three-wheeled vehicle, and functions as a suspension device for suspending the wheel.

As shown in FIG. 1, the hydraulic shock absorber 1 is of a telescopic type, and includes a cylindrical tube 11 (vehicle body-side tube) connected to a vehicle body-side bracket (not shown) and a cylindrical tube 12 (axle-side tube) connected to an axle-side bracket 13. The tube 12 moves relative to the tube 11 with a rod 16 as an axis and moves in and out of the tube 11. Inside the tube 12, a coil spring 14 that urges the tube 11 and the tube 12 in an extension direction is disposed. In the present embodiment, the hydraulic shock absorber 1 forms a pair of front forks in combination with another suspension device (not shown) having a coil spring 14 and no built-in damper. As another embodiment, front forks configured with suspension devices having built-in dampers on both left and right sides may be provided.

In the hydraulic shock absorber 1, when an impact due to unevenness of a road surface is received by the wheel (not shown), the tube 12 telescopically moves in and out of the tube 11. A process of compressing the hydraulic shock absorber 1 is referred to as a compression stroke, and a process of extending the hydraulic shock absorber 1 is referred to as an extension stroke. In the present embodiment, the inverted-type hydraulic shock absorber 1 in which the tube 12 moves in and out of the tube 11 is described, but the hydraulic shock absorber 1 can also be of an upright type in which the tube 11 moves in and out of the tube 12.

The hydraulic shock absorber 1 includes a cylinder 15 attached to an axle side of the tube 12 with a central axis C1 as an axis, and a rod 16 attached to a vehicle body side of the tube 11 with the central axis C1 as an axis. A direction in which the central axis C1 extends is referred to as an axial direction.

A vehicle body-side opening portion of the cylinder 15 is closed by a rod guide 17, and an axle side of the rod 16 penetrates the rod guide 17. The rod guide 17 slidably supports the rod 16, and a rebound spring 18 that generates a reaction force when the tube 11 and the tube 12 are fully extended is disposed on an axle side of the rod guide 17.

An interior of the cylinder 15 is filled with oil (hydraulic oil), and a piston 19 provided on the axle side of the rod 16 slides with respect to an inner peripheral surface of the cylinder 15 when the tube 11 and the tube 12 extend and contract. The piston 19 divides the cylinder 15 into a lower chamber 20 and an upper chamber 21.

As shown in FIG. 1, the rod 16 is a hollow shaft member having a flow path 22 through which the oil flows. The rod 16 has an opening portion 23 that opens in an axle-side end portion thereof and an opening portion 24 that opens in a vehicle body-side end portion thereof. In the present embodiment, the opening portion 23 is located inside the upper chamber 21 in the cylinder 15. The upper chamber 21 is a vehicle body-side oil chamber in the oil chambers defined by the piston 19 sliding inside the cylinder 15.

In the hydraulic shock absorber 1, during both the compression stroke and the extension stroke, the oil flows from the upper chamber 21 into the flow path 22, flows through an interior of the flow path 22 from an axle side thereof toward a vehicle body side thereof, and passes through a control unit 10 disposed on a vehicle body side of the rod 16.

A base valve 27 is disposed at an axle-side end portion of the cylinder 15, and the control unit 10 (damping force generating unit) is disposed on a cap member 25 that is disposed on the vehicle body side of the tube 11. The control unit 10 is a damping force generator that generates a damping force by flow of the oil flowing out from the opening portion 24 of the rod 16 (that is, flow of the oil generated due to the movement of the piston 19), and electronically controls an opening area of a variable throttle valve so as to control magnitude of the damping force generated when the oil passes through the variable throttle valve.

The control unit 10 provided in the hydraulic shock absorber 1 does not have to be an electronically controlled damping force generator, and a damping force generator that manually adjusts the damping force may be provided in the hydraulic shock absorber 1. The damping force generator provided in the hydraulic shock absorber 1 does not have to be a device formed as a unit on the vehicle body side of the tube 11. The hydraulic shock absorber 1 may be provided with a known substitutable damping force generator.

A vehicle body-side opening of the tube 11 is closed by the cap member 25, and an axle-side opening of the tube 12 is closed by the axle-side bracket 13. In order to prevent gas and oil enclosed inside the tube 11 and the tube 12 from leaking out, a tubular gap formed in an overlapping portion between the tube 11 and the tube 12 is closed with an oil seal or the like.

In the hydraulic shock absorber 1, the oil is stored in a reservoir 26 that is a space at an outer side of the cylinder 15 surrounded by the tube 11 and the tube 12. That is, the reservoir 26 is an oil chamber that stores oil and is defined at an outer side of the cylinder 15 and an inner side of the tube 11 and the tube 12. Since the reservoir 26 is not completely filled with oil, an air chamber occupied by a gas such as air from a liquid level (not shown) of the stored oil is formed on the vehicle body side. The reservoir 26 compensates for a volume of oil that enters the cylinder 15 when the rod 16 enters the cylinder 15 and a volume change of oil caused by a temperature change.

Figure 2:
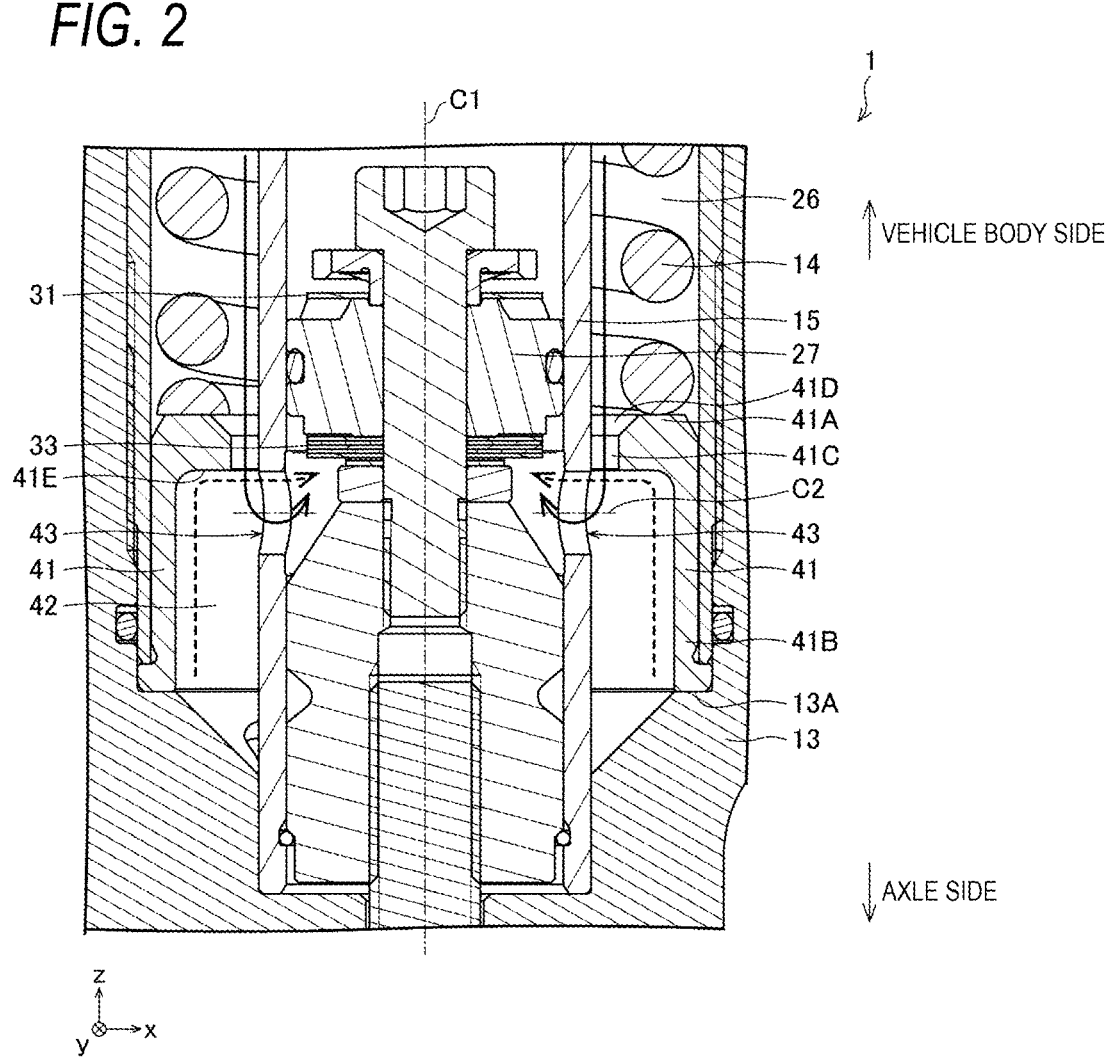
FIG. 2 is a cross-sectional view showing a configuration of an axle-side end portion of the hydraulic shock absorber.

FIG. 2 is a cross-sectional view showing a configuration of an axle-side end portion of the hydraulic shock absorber 1. As shown in FIG. 2, an opening portion 43 is formed in a side wall surface of the cylinder 15 on the axle-side thereof. At least one opening portion 43 is formed, for example, four opening portions 43 are formed. The opening portion 43 is an opening portion for the oil stored in the reservoir 26 to flow into the interior of the cylinder 15. These opening portions 43 are formed closer to the axle side than a multilayer valve 33 of the base valve 27. An opening central axis C2 of the opening portion 43 is orthogonal to the central axis C1.

Outside of the cylinder 15 (that is, an interior of the reservoir 26), a movement prevention member 41 that obstructs oil from moving from the axle side to the vehicle body side in the reservoir 26 is provided. The movement prevention member 41 includes a spring receiving portion 41A (axle-side surface) that receives one end of the coil spring 14, and a leg portion 41B that extends from the spring receiving portion 41A toward the axle side. The spring receiving portion 41A is located closer to the vehicle body side than the opening portions 43. It is sufficient that at least a part of the movement prevention member 41 is disposed on the vehicle body side of the opening portions 43.

An axle-side end portion of the leg portion 41B is abutted with a step portion 13A formed on an inner wall surface of the axle-side bracket 13, and an oil sump chamber 42 is defined by the movement prevention member 41, the inner wall surface of the axle-side bracket 13, and an outer wall surface of the cylinder 15.

Figure 3:
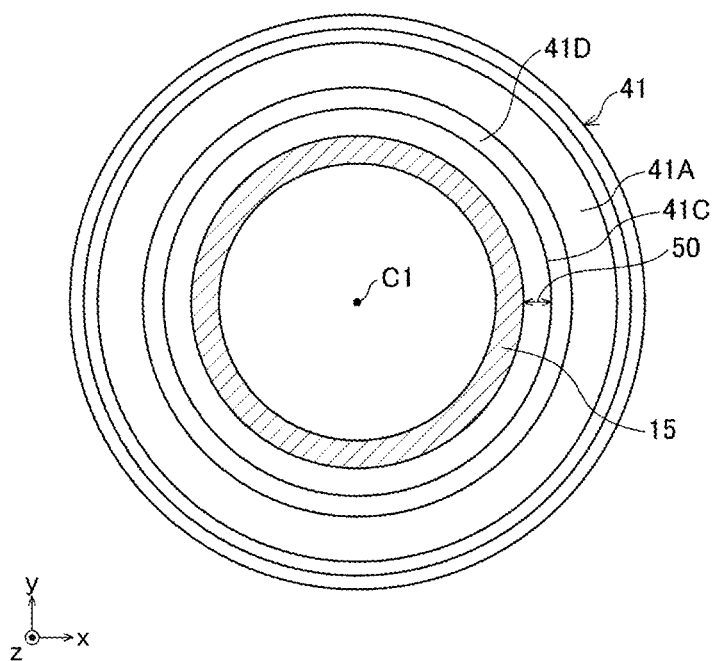
FIG. 3 is a top view of a movement prevention member when viewed from an axial direction.

FIG. 3 is a top view of the movement prevention member 41 when viewed from the axial direction. In FIG. 3, members other than the movement prevention member 41 and the cylinder 15 are omitted. As shown in FIG. 3, the spring receiving portion 41A has a substantially circular outer edge, and the leg portion 41B is formed in a tubular shape along the outer edge. An opening portion 41C for receiving the cylinder 15 is formed in the center of the spring receiving portion 41A. Since a diameter of the opening portion 41C is larger than an outer diameter of the cylinder 15, an annular gap 50 is formed between the opening portion 41C and the outer wall surface of the cylinder 15.

As shown by a solid arrow in FIG. 2, the oil in the reservoir 26 normally moves from the vehicle body side to the axle side through the gap 50 and then flows into the interior of the cylinder 15 through the opening portions 43. Therefore, it can be said that the movement prevention member 41 defines the gap 50 that allows the oil to flow from the vehicle body side to the axle side.

Since gas exists on the vehicle body side of the reservoir 26 as described above, when the hydraulic shock absorber 1 vibrates in the upper-lower direction, the oil inside the reservoir 26 moves to the vehicle body side, and no oil exists in a vicinity of the opening portions 43. When the hydraulic shock absorber 1 is rapidly extended in such a state, the oil supplied to the interior of the cylinder 15 is insufficient. As a result, air is mixed into the oil supplied to the control unit 10 through the flow path 22 of the rod 16, and a phenomenon called air biting occurs in which the damping force is not generated. When air biting occurs, the ride quality and maneuverability of the vehicle deteriorate.

The movement prevention member 41 is provided to prevent such a phenomenon. That is, as the hydraulic shock absorber 1 vibrates in the upper-lower direction, the oil on the axle side of the reservoir 26 moves to the vehicle body side as shown by a broken line arrow in FIG. 2. In the movement prevention member 41, a part of the oil flow is obstructed by the spring receiving portion 41A, and the oil is retained in the oil sump chamber 42. As a result, the oil can stay in the vicinity of the opening portions 43, and supply of the oil to the interior of the cylinder 15 can be prevented from being interrupted. An axle-side surface 41E of the spring receiving portion 41A corresponds to an axle-side surface of the movement prevention member 41 that obstructs a movement of the oil toward the vehicle body side.

In this way, in order to make the oil whose movement is obstructed by the spring receiving portion 41A efficiently flows into the interior of the cylinder 15 from the opening portions 43, it is preferable that a portion of the opening 43 closest to the vehicle body side is substantially the same in position with the surface 41E of the spring receiving portion 41A. In the example shown in FIG. 2, the surface 41E of the spring receiving portion 41A is flat, and the surface 41E and the portion of the opening portion 43 closest to the vehicle body side are adjacent to each other in the axial direction of the hydraulic shock absorber 1. For example, a position of the surface 41E in the axial direction and a position of the portion of the opening portion 43 closet to the vehicle body side in the axial direction are substantially the same within a range in consideration of a design error.

However, the position of the movement prevention member 41, particularly the position of the surface 41E, is not limited to that shown in FIG. 2, and the position of the surface 41E in the axial direction may overlap with that of the opening portion 43 or the surface 41E may be located closer to the vehicle body side than the opening portion 43. Further, as to be shown in an example in Embodiment 2, the surface 41E does not have to be flat.

It is preferable that an opening area of the gap 50 is equal to or larger than a sum of opening areas of the plurality of opening portions 43. This is because when the opening area of the gap 50 is smaller than the sum of the opening areas of the plurality of opening portions 43, a flow path resistance of the oil passing through the gap 50 increases, and inflow of the oil into the interior of cylinder 15 is obstructed.

Further, as shown in FIGS. 2 and 3, the movement prevention member 41 has an inclined surface 41D between the vehicle body-side surface of the spring receiving portion 41A and the opening portion 41C. If the inclined surface 41D is regarded as a part of the opening portion 41C, a diameter of the opening portion 41C formed in the movement prevention member 41 is larger on the vehicle body side than on the axle side.

Therefore, the oil flowing from the vehicle body side toward the axle side efficiently passes through the opening portion 41C, but the oil flowing from the axle side toward the vehicle body side tends to be obstructed.

(Flow of Oil in Hydraulic Shock Absorber 1)

In the compression stroke, as a volume of the upper chamber 21 (with reference to FIG. 1) increases, the oil flows from the lower chamber 20 toward the upper chamber 21. Then, an amount of oil in the lower chamber 20 corresponding to an infiltrated volume of the rod 16 is surplus, so that the surplus oil passes through the opening portions 43 and flows out to the reservoir 26.

Meanwhile, in the extension stroke, as a volume of the lower chamber 20 increases, the oil in the reservoir 26 passes through the opening portions 43 and flows into the cylinder 15.

Overview

As described above, the hydraulic shock absorber 1 includes: the tube 11 on the vehicle body side; the tube 12 on the axle side; the cylinder 15 that is provided in the tube 11 and has at least one opening portion 43 in the axle-side side wall surface; the reservoir 26 that is defined at an outer side of the cylinder 15 and stores oil; the rod 16 that is provided on the tube 11; the piston 19 that is provided on the axle side of the rod 16 and slides with respect to the inner peripheral surface of the cylinder 15; the control unit 10 that generates a damping force by oil flow due to movement of the piston 19; and the movement prevention member 41 at least a part of which is disposed outside the cylinder 15 and on the vehicle body side of the opening portion 43, and that obstructs the oil from moving from the axle side to the vehicle body side.

According to the configuration, even when the vehicle on which the hydraulic shock absorber 1 is mounted vibrates in the upper-lower direction, the oil stays in the vicinity of the opening portion 43 since the movement prevention member 41 obstructs the upward movement of the oil in the reservoir 26.

Therefore, even when the hydraulic shock absorber 1 is rapidly extended, since the oil is supplied to the interior of the cylinder 15, air is not mixed into the oil flowing into the control unit 10, and therefore, the damping force can be stably generated.

The axle-side surface 41E of the movement prevention member 41 and the portion of the opening portion 43 closest to the vehicle body side are adjacent to each other in the axial direction of the hydraulic shock absorber 1. Therefore, the oil whose movement is obstructed by the surface 41E of the movement prevention member 41 can efficiently flow into the opening portion 43.

The movement prevention member 41 defines a gap 50, that allows the oil to flow from the vehicle body side to the axle side, between the movement prevention member 41 and the side wall surface of the cylinder 15. The oil in the reservoir 26 moves from the vehicle body side to the axle side through the gap 50. By setting the gap between the movement prevention member 41 and the side wall surface of the cylinder 15 as a flow path of the oil, the flow path can be formed more easily than in a case where the flow path is formed in another portion of the movement prevention member 41.

Further, by forming the gap 50 along at least a part of a periphery of the side wall surface of the cylinder 15, the oil in the reservoir 26 can move from the vehicle body side to the axle side.

Further, the opening area of the gap 50 is equal to or larger than a sum of an opening area of the at least one opening portion 43. With the configuration, the flow path resistance of the oil passing through the gap 50 is reduced, and obstruction on supply of the oil to the interior of the cylinder 15 can be prevented.

The coil spring 14 is provided inside the reservoir 26, and the movement prevention member 41 includes the spring receiving portion 41A that receives the coil spring 14, and the leg portion 41B that extends from the spring receiving portion 41A toward the axle side. With the configuration, the movement prevention member 41 can also function as a spring receiving portion that receives the coil spring 14 inside the reservoir 26.

Embodiment 2

Another embodiment of the present invention will be described below. For convenience of description, members having the same functions as those described in the above embodiment are denoted by the same reference numerals, and description thereof will not be repeated.

Figure 4:
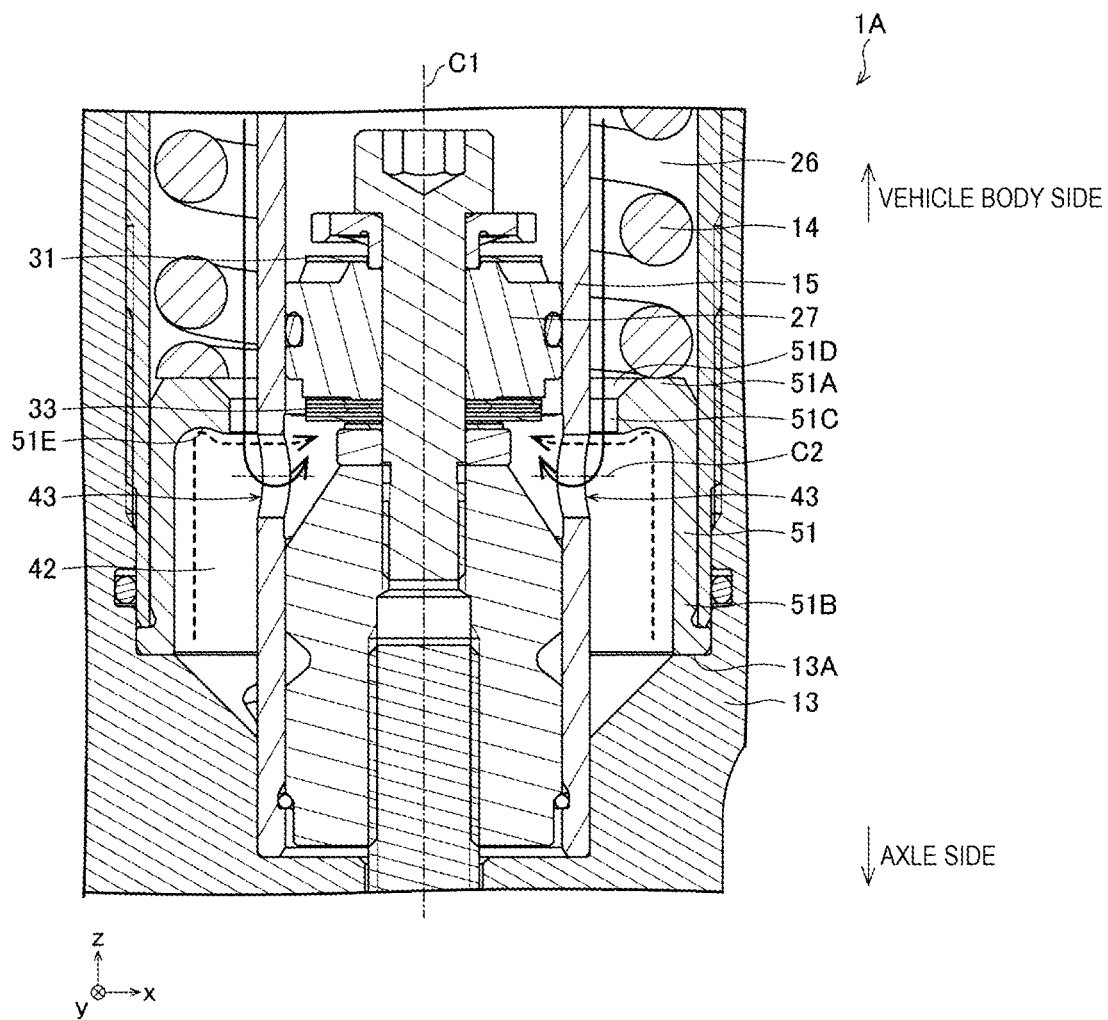
FIG. 4 is a cross-sectional view showing a configuration of an axle-side end portion of a hydraulic shock absorber according to another embodiment of the present invention.

FIG. 4 is a cross-sectional view showing a configuration of an axle-side end portion of a hydraulic shock absorber 1A according to the present embodiment. As shown in FIG. 4, similarly to the movement prevention member 41, a movement prevention member 51 provided in the hydraulic shock absorber 1A includes a spring receiving portion 51A, a leg portion 51B, an opening portion MC, and an inclined surface MD. The movement prevention member 51 is different from the movement prevention member 41 in that the movement prevention member 51 has a recess portion 51E, that is recessed toward the vehicle body side, on an axle-side surface of the spring receiving portion 51A. Therefore, a portion of the recess portion 51E closest to the vehicle body side (bottom of the recess portion) is located closer to the vehicle body side than a portion of the opening portion 43 closest to the vehicle body side.

An axle-side surface of a portion forming the opening portion 51C is substantially the same in position with a portion of the opening portion 43 closest to the vehicle body side. This point is the same as the movement prevention member 41 of Embodiment 1.

Embodiment 3

Another embodiment of the present invention will be described below. The movement prevention member 51 can also be applied to a modification of the present embodiment.

The gap 50 formed by the movement prevention member 41 does not necessarily have to be formed over an entire periphery of the side wall surface of the cylinder 15, and may be formed along at least a part of the side wall surface.

The spring receiving portion for receiving the coil spring 14 may be provided separately from the movement prevention member 41, and the movement prevention member 41 without the leg portion 41B may be disposed on the vehicle body side of the opening portion 43.

The spring receiving portion 41A may have an opening portion as an alternative of the gap 50, which allows the oil to flow from the vehicle body side to the axle side, at a position away from the side wall surface of the cylinder 15. Further, the opening portion may have a structure or a shape that allows flow of the oil from the vehicle body side to the axle side and restricts flow of the oil from the axle side to the vehicle body side.

For example, an opening portion may be formed in the spring receiving portion 41A, and a check valve that allows flow of the oil from the vehicle body side to the axle side, and restricts flow of the oil from the axle side to the vehicle body side may be provided in the opening portion.

The present invention is not limited to the embodiments described above, various modifications can be made within the scope of the claims, and embodiments obtained by appropriately combining technical means disclosed in different embodiments are also included in the technical scope of the present invention.

REFERENCE SIGNS LIST

1: hydraulic shock absorber
10: control unit (damping force generating unit)
11: tube (vehicle body-side tube)
12: tube (axle-side tube)
14: coil spring
15: cylinder
16: rod
19: piston
26: reservoir
43: opening portion
41: movement prevention member
41A: spring receiving portion
41B: leg portion
41D: inclined surface
41E: surface
50: gap
51: movement prevention member
51E: recess portion

What is claimed is:

1. A hydraulic shock absorber comprising:
   a vehicle body-side tube that is disposed on a vehicle body side;
   an axle-side tube that is disposed on an axle side;
   a cylinder that is provided in the axle-side tube and has at least one opening portion in an axle-side side wall surface;
   a reservoir that is defined at an outer side of the cylinder and stores oil;
   a rod that is provided in the vehicle body-side tube;
   a piston that is provided on an axle side of the rod, and slides relative to an inner peripheral surface of the cylinder;
   a damping force generating unit that generates a damping force by oil flow due to a movement of the piston; and
   a movement prevention member at least a part of which is disposed outside the cylinder and on a vehicle body side of the opening portion, and that obstructs oil from moving from the axle side to the vehicle body side, wherein
   the movement prevention member defines a gap, that allows oil to flow from the vehicle body side to the axle side, between the movement prevention member and the side wall surface of the cylinder.

2. The hydraulic shock absorber according to claim 1, wherein
   the gap is formed along at least a part of a periphery of the side wall surface of the cylinder.

3. The hydraulic shock absorber according to claim 2, wherein
   an opening area of the gap is equal to or larger than a sum of an opening area of the at least one opening portion.

4. The hydraulic shock absorber according to claim 2, wherein
   an axle-side surface of the movement prevention member that obstructs movement of the oil and a portion of the at least one opening portion that is closest to the vehicle body side are adjacent to each other in an axial direction of the hydraulic shock absorber.

5. The hydraulic shock absorber according to claim 3, wherein
   an axle-side surface of the movement prevention member that obstructs movement of the oil and a portion of the at least one opening portion that is closest to the vehicle body side are adjacent to each other in an axial direction of the hydraulic shock absorber.

6. The hydraulic shock absorber according to claim 1, wherein
   an opening area of the gap is equal to or larger than a sum of an opening area of the at least one opening portion.

7. The hydraulic shock absorber according to claim 6, wherein
   an axle-side surface of the movement prevention member that obstructs movement of the oil and a portion of the at least one opening portion that is closest to the vehicle body side are adjacent to each other in an axial direction of the hydraulic shock absorber.

8. The hydraulic shock absorber according to claim 1, wherein
   an axle-side surface of the movement prevention member that obstructs movement of the oil and a portion of the at least one opening portion that is closest to the vehicle body side are adjacent to each other in an axial direction of the hydraulic shock absorber.

9. A hydraulic shock absorber comprising:
a vehicle body-side tube that is disposed on a vehicle body side;
an axle-side tube that is disposed on an axle side;
a cylinder that is provided in the axle-side tube and has at least one opening portion in an axle-side side wall surface;
a reservoir that is defined at an outer side of the cylinder and stores oil;
a rod that is provided in the vehicle body-side tube;
a piston that is provided on an axle side of the rod, and slides relative to an inner peripheral surface of the cylinder;
a damping force generating unit that generates a damping force by oil flow due to a movement of the piston; and
a movement prevention member at least a part of which is disposed outside the cylinder and on a vehicle body side of the opening portion, and that obstructs oil from moving from the axle side to the vehicle body side, wherein
a spring is provided inside the reservoir, and
the movement prevention member includes a spring receiving portion that receives the spring, and a leg portion that extends from the spring receiving portion toward the axle side.

* * * * *